United States Patent
Liu et al.

(10) Patent No.: US 12,015,559 B2
(45) Date of Patent: Jun. 18, 2024

(54) SERVICE PROCESSING METHOD, DEVICE, CHIP, AND COMPUTER PROGRAM

(71) Applicant: GUANGDONG OPPO MOBILE TELECOMMUNICATIONS CORP., LTD., Guangdong (CN)

(72) Inventors: Jianhua Liu, Guangdong (CN); Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 293 days.

(21) Appl. No.: 17/390,652

(22) Filed: Jul. 30, 2021

(65) Prior Publication Data
US 2022/0021623 A1 Jan. 20, 2022

Related U.S. Application Data

(63) Continuation of application No. PCT/CN2019/074316, filed on Feb. 1, 2019.

(51) Int. Cl.
*H04L 47/27* (2022.01)
*H04L 43/0852* (2022.01)
*H04W 24/08* (2009.01)

(52) U.S. Cl.
CPC .......... *H04L 47/27* (2013.01); *H04L 43/0858* (2013.01); *H04W 24/08* (2013.01)

(58) Field of Classification Search
CPC ....... H04L 41/16; H04L 47/24; H04L 47/283; H04L 47/56; H04L 63/1416; H04W 28/02; H04W 72/12
See application file for complete search history.

(56) References Cited

U.S. PATENT DOCUMENTS

| 7,818,389 | B1 | 10/2010 | Chiang et al. | |
|---|---|---|---|---|
| 2020/0259896 | A1* | 8/2020 | Sachs | H04J 3/0667 |
| 2020/0336435 | A1* | 10/2020 | Zhang | H04L 67/61 |

(Continued)

FOREIGN PATENT DOCUMENTS

| CN | 107229455 A | 10/2017 |
|---|---|---|
| CN | 107395659 A | 11/2017 |
| CN | 108023758 A | 5/2018 |

(Continued)

OTHER PUBLICATIONS

The first Office Action of corresponding European application No. 19912772.1, dated Jul. 7, 2022.

(Continued)

*Primary Examiner* — Iqbal Zaidi
(74) *Attorney, Agent, or Firm* — Ladas & Parry LLP

(57) ABSTRACT

The present application discloses a service processing method, a device, a chip and a computer program, where the method includes: acquiring, by a first device, ingress window information of a service data packet; acquiring, by the first device, transmission delay information of the service data packet; and determining, by the first device, egress window information of the service data packet according to the ingress window information and the transmission delay information, which are acquired. By applying the solution of the present application, the egress window information and the like can be determined effectively.

17 Claims, 4 Drawing Sheets

(56) References Cited

U.S. PATENT DOCUMENTS

2022/0014485 A1* 1/2022 Pocovi .................. H04L 1/187

FOREIGN PATENT DOCUMENTS

| CN | 108282415 A | 7/2018 |
| --- | --- | --- |
| CN | 109285028 A | 1/2019 |

OTHER PUBLICATIONS

The second Office Action of corresponding Chinese application No. 201980062157.8, dated Aug. 25, 2022.

The second Office Action of corresponding European application No. 19912772.1, dated Jan. 18. 2023.

The Notice of Rejection of corresponding Chinese application No. 201980062157.8, dated Dec. 1, 2022.

The EESR of corresponding European application No. 19912772.1. dated Feb. 17, 2022.

Nokia et al: "TSN-QOS Framework", 3GPP Draft; S2-1811433. vol. SA WG2, no. Dongguan, China; Oct. 18, 2018(Oct. 18, 2018), XP051540237.

Huawei et al: "QoS Negotiation between 3GPP and TSN network KI#3.1",3GPP Draft; S2-1810475_TR23.734_SOLUTION for KI 3 vol. SA WG2, no. Dongguan, China; Oct. 9, 2018(Oct. 9, 2018), XP051539452.

3GPP TS 23.501 V16.7.0 (Dec. 2020)3rd Generation Partnership Project; Technical Specification Group Services and System Aspects; System architecture for the 5G System (5GS); Stage 2(Release 16).

The second Office Action of corresponding Chinese application No. 201980062157.8, dated Aug. 25, 2022 with machine translation by Global Dossier.

International Search Report (ISR) dated Nov. 1, 2019 for Application No. PCT/CN2019/074316.

The first Office Action of corresponding Chinese application No. 201980062157.8, dated May 20, 2022.

\* cited by examiner

SERVICE PROCESSING METHOD, DEVICE, CHIP, AND COMPUTER PROGRAM

CROSS-REFERENCE TO RELATED APPLICATIONS

This application is a continuation of International Application No. PCT/CN2019/074316, filed on Feb. 1, 2019, the content of which is hereby incorporated by reference in its entirety.

TECHNICAL FIELD

The present application relates to wireless network technologies, and in particular, to a service processing method, a device, a chip and a computer program.

BACKGROUND

In a Time Sensitive Network (TSN), a fifth generation mobile communication system (5GS, 5th Generation System) serves as a TSN bridge to provide services for a TSN network and services. FIG. 1 is a schematic diagram of an existing TSN bridge. Currently, a TSN service that needs to be supported is mainly a deterministic service. In a specific implementation, it needs to ensure that time when a TSN service data packet arrives at the 5GS is within one duration, that is, within an ingress duration, and time when the TSN service data packet leaves the 5GS is also within one duration, that is, within an egress duration. However, there is no corresponding implementation on how to determine egress window information.

SUMMARY

In view of this, embodiments of the present application provide a service processing method, a device, a chip and a computer program.

In a first aspect, a service processing method is provided, including:
  acquiring, by a first device, ingress window information of a service data packet;
  acquiring, by the first device, transmission delay information of the service data packet; and
  determining, by the first device, egress window information of the service data packet according to the ingress window information and the transmission delay information.

In a second aspect, provided is a service processing device for executing the method of the above mentioned first aspect or each implementation thereof.

Specifically, the service processing device includes function modules configured to execute the method of the above mentioned first aspect or each implementation thereof.

In a third aspect, provided is a communication device, including a processor and a memory, where the memory is configured to store a computer program, and the processor is configured to invoke and run the computer program stored in the memory, so as to execute the method of the above mentioned first aspect or each implementation thereof.

In a fourth aspect, provided is a chip for implementing the method of the above mentioned first aspect or each implementation thereof.

Specifically, the chip includes: a processor, configured to invoke and run a computer program from a memory, so as to cause a device equipped with the chip to execute the method of the above mentioned the first aspect or each implementation thereof.

In a fifth aspect, provided is a computer readable storage medium for storing a computer program, where the computer program enables a computer to execute the method of the above mentioned first aspect or each implementation thereof.

In a sixth aspect, provided is a computer program product, including computer program instructions, where the computer program instructions enable a computer to execute the method of the above mentioned first aspect or each implementation thereof.

In a seventh aspect, provided is a computer program, which, when running on a computer, enables the computer to execute the method of the above mentioned first aspect or each implementation thereof.

Based on the above description, it can be seen that, by adopting the solution of the present application, the egress window information of the service data packet can be determined effectively, thus, for example, a TSN service data packet can leave the 5GS at determined time after arriving at the 5GS at determined time, which enables transmission characteristics and transmission requirements of the TSN service data packet to be ensured by the 5GS serving as a part of a TSN system architecture.

DESCRIPTION OF EMBODIMENTS

Hereinafter, technical solutions in embodiments of the present application will be described with reference to the accompanying drawings in the embodiments of the present application. Apparently, the described embodiments are a part of the embodiments of the present application, rather than all of the embodiments. Based on the embodiments of the present application, all other embodiments obtained by a person of ordinary skill in the art without paying creative efforts all belong to the protection scope of the present application.

The technical solutions in the embodiments of the present application may be applied to various communication systems, for example, a Global System of Mobile communication (GSM), a Code Division Multiple Access (CDMA) system, a Wideband Code Division Multiple Access (WCDMA) system, General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
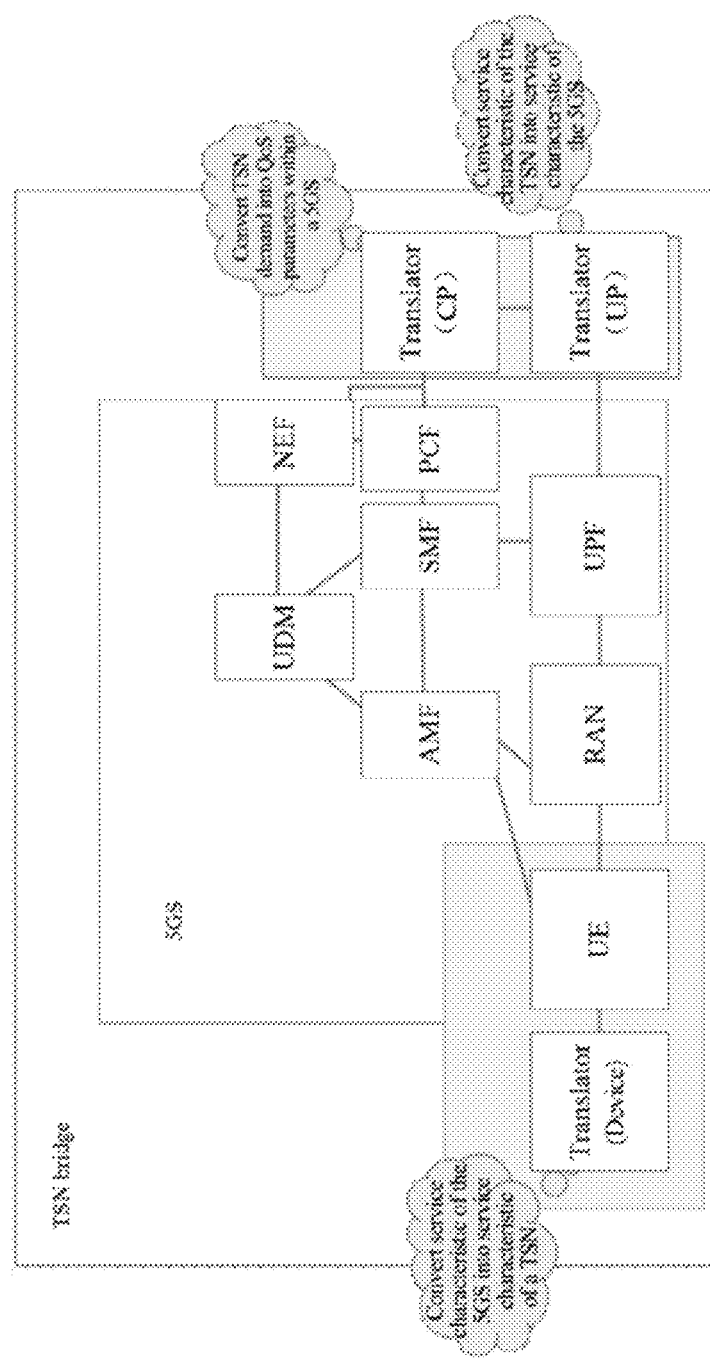
FIG. 1 is a schematic diagram of an existing TSN bridge.
Figure 2:
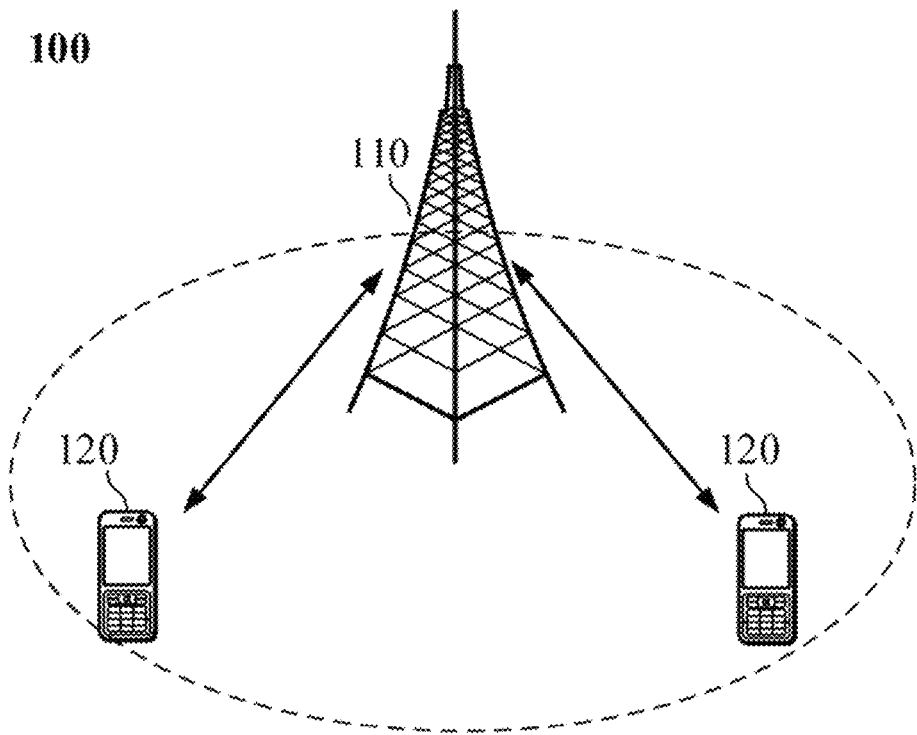
FIG. 2 is a schematic diagram of an architecture of a communication system according to an embodiment of the present application.

Illustratively, FIG. 2 is a schematic diagram of an architecture of a communication system according to an embodiment of the present application. The communication system 100 may include a network device 110, and the network device 110 may be a device in communication with a terminal device 120 (or referred to as a communication terminal, a terminal). The network device 110 may provide communication coverage for a specific geographic area and may communicate with the terminal device located within the coverage area. In an embodiment, the network device 110 may be a base station (BTS, Base Transceiver Station) in a GSM system or a CDMA system, it may also be a base station (NB, Node B) in a WCDMA system, it may also be an evolutional base station (an eNB or an eNodeB, Evolutional Node B) in an LTE system, or it may be a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, or a network device in a future evolved Public Land Mobile Network (PLMN), etc.

The communication system 100 further includes at least one terminal device 120 within the coverage of the network device 110. The "terminal device" used herein includes, but is not limited to, an apparatus connected via a wired line, such as a Public Switched Telephone Network (PSTN), a Digital Subscriber Line (DSL), a digital cable, and a cable; and/or another data connectivity/network; and/or via a wireless interface, for example, for a cellular network, a Wireless Local Area Network (WLAN), a digital television network such as a DVB-H network, a satellite network, and an AM-FM broadcast transmitter; and/or another terminal device configured to receive/send a communication signal; and/or an Internet of Things (IoT) device. The terminal device configured to communicate through a wireless interface may be referred to as a "wireless communication terminal", a "wireless terminal", or a "mobile terminal". Examples of the mobile terminal include, but are not limited to, a satellite or a cellular telephone; a Personal Communication System (PCS) terminal that may combine a cellular radiotelephone with capabilities of data processing, facsimile and data communication; a PDA that may include a radiotelephone, a pager, Internet/intranet access, a Web browser, a note, a calendar, and/or a receiver of Global Positioning System (GPS); and other electronic devices that include a conventional laptop and/or palm type receiver or a radiotelephone transceiver. The terminal device may refer to an access terminal, a user equipment (UE), a user unit, a user station, a mobile station, a mobile platform, a remote station, a remote terminal, a mobile device, a user terminal, a terminal, a wireless communication device, a user proxy, or a user apparatus. The access terminal may be a cellular telephone, a cordless telephone, a Session Initiation Protocol (SIP) telephone, a Wireless Local Loop (WLL) station, a Personal Digital Assistant (PDA), a handheld device having a function of wireless communication, a computing device or other processing devices connected to a wireless modem, a vehicle-mounted device, a wearable device, a terminal device in the 5G network, or a terminal device in the future evolved PLMN, etc.

In an embodiment, Device to Device (D2D) communication may be performed between terminal devices 120.

In an embodiment, the 5G system or the 5G network may also be referred to as an NR system or an NR network.

The technical solutions of the embodiments of the present application may be applied to an unlicensed spectrum, and may also be applied to a licensed spectrum, which is not limited in the embodiments of the present application.

FIG. 2 shows one network device and two terminal devices illustratively. In an embodiment, the communication system 100 may include a plurality of network devices, and the coverage of each network device may include other number of terminal devices, which is not limited in the embodiments of the present application.

In an embodiment, the communication system 100 may further include other network entities such as a network controller and a mobility management entity, which is not limited in the embodiments of the present application.

It should be understood that, a device having a communication function in the network/system in the embodiments of the present application may be referred to as a communication device. Taking the communication system 100 shown in FIG. 2 as an example, the communication device may include the network device 110 and the terminal device 120 having the communication function, and the network device 110 and the terminal device 120 may be specific devices described above, which will not be described again herein. The communication device may further include other devices in the communication system 100, for example, other network entities such as a network controller and a mobility management entity, which is not limited in the embodiments of the present application.

It should be understood that, the terms "system" and "network" are often used interchangeably herein. The term "and/or" herein is merely an association relationship describing an associated object, and indicates that there may be three relationships. For example, A and/or B may indicate that there are three cases: A alone, A and B together, and B alone. In addition, the character "/" herein generally indicates that the front and back associated objects are of an "or" relationship.

Figure 3:
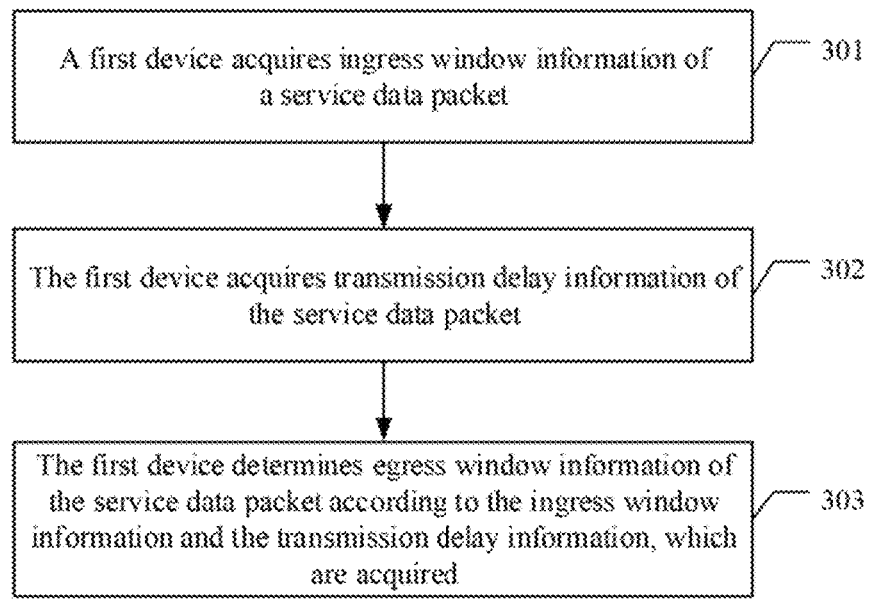
FIG. 3 is a schematic flowchart of a service processing method according to an embodiment of the present application.

FIG. 3 is a schematic flowchart of a service processing method according to an embodiment of the present application. As shown in FIG. 3, the following specific implementations are included.

In 301, a first device acquires ingress window information of a service data packet.

In 302, the first device acquires transmission delay information of the service data packet.

In 303, the first device determines egress window information of the service data packet according to the ingress window information and the transmission delay information, which are acquired.

In an embodiment, the service data packet is a TSN service data packet. The following takes the TSN service data packet as an example for description.

The acquired ingress window information may include at least one of the following: a TSN time point of earliest arrival, a TSN time point of latest arrival, an ingress duration, and a window identity of an ingress window. The acquired transmission delay information may include a maximum delay and a minimum delay. The acquired egress window information may include at least one of the following: an earliest TSN time point to leave a 5GS, a latest TSN time point to leave the 5GS, an egress duration, and a window identity of an egress window.

The first device may further acquire processing object information, which can also be included in the ingress window information and the egress window information respectively. The processing object information may include at least one of the following: granularity indication information, a service identity, a quality of service (QoS) flow identity, a protocol data unit (PDU) session identity, IP five-tuple information, a bearer identity, an Ethernet address, a service identity list, a QoS flow identity list, a PDU session identity list, an IP five-tuple information list, a bearer identity list, an Ethernet address list, etc.

In an embodiment, a determination manner of the earliest TSN time point to leave the 5GS, the latest TSN time point to leave the 5GS, and the egress duration may be shown as follows respectively:

the earliest TSN time point to leave the 5GS=the TSN time point of the latest arrival+the minimum delay;

the latest TSN time point to leave the 5GS=the TSN time point of the latest arrival+the maximum delay; and the egress duration=the latest TSN time point to leave the 5GS−the earliest TSN time point to leave the 5GS.

Figure 4:
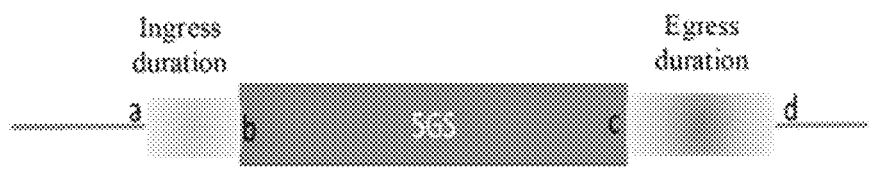
FIG. 4 is a schematic diagram of a TSN time point of earliest arrival, a TSN time point of latest arrival, an ingress duration, an earliest TSN time point to leave a 5GS, a latest TSN time point to leave the 5GS, and an egress duration according to an embodiment of the present application.

FIG. 4 is a schematic diagram of a TSN time point of earliest arrival, a TSN time point of latest arrival, an ingress duration, an earliest TSN time point to leave a 5GS, a latest TSN time point to leave the 5GS, and an egress duration according to an embodiment of the present application. As shown in FIG. 4, a represents the TSN time point of the earliest arrival, b represents the TSN time point of the latest arrival, b−a=the ingress duration, c represents the earliest TSN time point to leave the 5GS, d represents the latest TSN time point to leave the 5GS, and d-c represents the egress duration.

The above determination manner of the earliest TSN time point to leave the 5GS and the latest TSN time point to leave the 5GS is merely an example for illustration, and is not intended to limit the technical solutions of the present application, and other determination manners may also be adopted according to actual needs. For example: the earliest TSN time point to leave the 5GS=the TSN time point of the earliest arrival+the ingress duration+the minimum delay, and/or, the latest TSN time point to leave the 5GS=the TSN time point of the earliest arrival+the ingress duration+the maximum delay. For another example, the earliest TSN time point to leave the 5GS=the TSN time point of the earliest arrival +the minimum delay, and/or, the latest TSN time point to leave the 5GS=the TSN time point of the earliest arrival+the maximum delay, etc.

A first processing object may be determined according to the processing object information. The first processing object may include at least one of the following: a service (such as each TSN service), a QoS flow, a PDU session, IP five-tuple, a bearer, an Ethernet address, a service list, a QoS flow list, a PDU session list, an IP five-tuple list, a bearer list, an Ethernet address list, etc.

For example, the first processing object may include at least one of the following: a service with a specific identity, a QoS flow with a specific identity, a PDU session with a specific identity, an IP five-tuple with a specific identity, a bearer with a specific identity, an Ethernet address with a specific identity, a service list with a specific identity, a QoS flow list with a specific identity, a PDU session list with a specific identity, an IP five-tuple list with a specific identity, a bearer list with a specific identity, and an Ethernet address list with a specific identity. In an embodiment, the first device may process according to the first processing object, for example, may determine the ingress window information, the egress window information, relationship information between an ingress window and an egress window, an ingress window corresponding to a data packet, an egress window corresponding to the data packet, first notification information, second notification information, third notification information, fourth notification information, etc.

The first device may include at least one of the following: a session management function (SMF) entity, an access and mobility management function (AMF) entity, a policy control function (PCF) entity, a translator, a centralized network configuration (CNC) entity, etc. The first device may be configured by a TSN centralized network configuration (CNC) entity.

The first device may further send first notification information to an ingress node of a 5GS for transmitting a TSN service. The first notification information may include at least one of the following: processing object information, a TSN time point of earliest arrival, a TSN time point of latest arrival, an ingress duration, a window identity of an ingress window, an identity of the TSN service, an egress duration, a window identity of an egress window, an earliest TSN time point to leave the 5GS, a latest TSN time point to leave the 5GS, a minimum delay, a maximum delay, a packet arrival duration (a service period), a packet size, reference time or offset, quality of service flow identity (QFI) information corresponding to the TSN service, protocol data unit (PDU) session information corresponding to the TSN service, bearer information corresponding to the TSN service, IP five-tuple information corresponding to the TSN service, and Ethernet address information corresponding to the TSN service. The PDU session information may at least include PDU session identity information, the bearer information may at least include bearer identity information, and the IP five-tuple information may at least include address information. In an embodiment, the above information may be list information, such as PDU session list information, QFI list information, bearer list information, etc.

The first notification information may be used to help the ingress node of the 5GS for transmitting the TSN service to determine the processing object information and/or the identity of the TSN service, and/or, the QFI information and/or the PDU session information and/or the bearer information bearing the TSN service, and/or, the packet arrival duration, and/or, the reference time or the offset, and/or, the ingress window information, and/or, the egress window information corresponding to the ingress window information, which correspond to the information.

The first device may send the first notification information to the ingress node of the 5GS for transmitting the TSN service through a Non-Access Stratum (NAS) message. The ingress node of the 5GS for transmitting the TSN service may include at least one of the following: a user plane function (UPF) entity, a user equipment (UE), a translator, etc.

The ingress node of the 5GS for transmitting the TSN service may send the TSN service data packet received within the ingress window to the 5GS. Alternatively, the ingress node of the 5GS for transmitting the TSN service may send the received TSN service data packet within a corresponding ingress window according to identity information, for example, the TSN service identity. In an embodiment, a TSN service data packet received between two ingress windows may be sent in a latter ingress window.

The above first notification information may further include: sending indication information, where the sending indication information is used to indicate whether the ingress node of the 5GS for transmitting the TSN service needs to send dedicated information simultaneously when sending the TSN service data packet.

The dedicated information includes at least one of the following: a time stamp when the TSN service data packet arrives at the 5GS, and a corresponding window identity of an ingress window when the TSN service data packet arrives at the 5GS, i.e. an ingress window identity. In an embodiment, the dedicated information is indicated in the TSN service data packet by adding a dedicated bit.

If the sending indication information indicates that the dedicated information needs to be sent simultaneously, the ingress node of the 5GS for transmitting the TSN service also needs to send the dedicated information simultaneously when sending the TSN service data packet. If the sending indication information indicates that the dedicated information does not need to be sent simultaneously, the ingress node of the 5GS for transmitting the TSN service does not need to send the dedicated information simultaneously when sending the TSN service data packet.

For example, if a value of the sending indication information is 1, it means that dedicated information needs to be sent simultaneously, and if the value is 0, it means that dedicated information needs not to be sent simultaneously. Alternatively, when the dedicated information does not need to be sent, the sending indication information is not included in the first notification information, and in this case, once the first notification information includes the sending indication information, it can be determined that the dedicated information needs to be sent.

When the ingress node of the 5GS for transmitting the TSN service does not need to send the dedicated information when sending the TSN service data packet, a time interval between two adjacent ingress windows or two adjacent egress windows needs to be greater than or equal to a first threshold. The first threshold may include at least one of the following: a maximum delay; a maximum delay-time of a packet from a UPF to a Radio Access Network (RAN)-packet processing time of a terminal device; and a maximum delay-time of a packet from the UPF to the RAN-packet processing time of the terminal device-air interface transmission time. The time of the packet from the UPF to the RAN and the packet processing time of the terminal device may both refer to average processing time of each packet.

If it is necessary to break the limitation on the time interval between two adjacent ingress windows or two adjacent egress windows, then, the ingress node of the 5GS for transmitting the TSN service needs to send the dedicated information simultaneously when sending the TSN service data packet, where the dedicated information is used to help an egress node of the 5GS for transmitting the TSN service to determine by which egress window the received TSN service data packet should be sent, to ensure a stable delay demand for message sending of the TSN system.

It should be noted that, the ingress node of the 5GS for transmitting the TSN service may also autonomously determine whether the dedicated information needs to be sent, or the ingress node of the 5GS for transmitting the TSN service sends the dedicated information simultaneously when sending each data packet by default, or the ingress node of the 5GS for transmitting the TSN service does not send the dedicated information when sending each data packet by default.

The first device may further send second notification information to an egress node of a 5GS for transmitting a TSN service. The second notification information may include at least one of the following: processing object information, an earliest TSN time point to leave the 5GS, a latest TSN time point to leave the 5GS, an egress duration, a window identity of an egress window, a window identity of an ingress window, an identity of the TSN service, an ingress duration, an earliest TSN time point to arrive at the 5GS, a latest TSN time point to arrive at the 5GS, a minimum delay, a maximum delay, a packet arrival duration, a packet size, reference time or offset, QFI information corresponding to the TSN service, PDU session information corresponding to the TSN service, bearer information corresponding to the TSN service, IP five-tuple information corresponding to the TSN service, Ethernet address information corresponding to the TSN service, etc.

The second notification information may be used to help the egress node of the 5GS for transmitting the TSN service to determine the processing object information and/or the identity of the TSN service, and/or, the QFI information and/or the PDU session information and/or the bearer information bearing the TSN service, and/or, a time point for the packet to leave the 5GS, and/or, the egress window information, and/or, the ingress window information corresponding to the egress window information, which correspond to the information.

The first device may send the second notification information to the egress node of the 5GS for transmitting the TSN service through a NAS message. The egress node of the 5GS for transmitting the TSN service may include at least one of the following: a translator, a terminal device, a UPF, etc.

The egress node of the 5GS for transmitting the TSN service may send the TSN service data packet received within the egress window from the 5GS to a next node in a TSN bridge. Alternatively, the egress node of the 5GS for transmitting the TSN service may send the received TSN service data packet within a corresponding egress window according to identity information, for example, the TSN service identity. In an embodiment, for a TSN service data packet received before a moment when an egress window corresponding to an ingress window is available (for example, between a time point c and a time point d shown in FIG. 4), the packet may be sent at a moment when the corresponding egress window is available (for example, between the time point c and the time point d).

The first device may further send third notification information to a base station (such as an RAN base station). The third notification information may include at least one of the following: processing object information, a minimum delay, a maximum delay, a packet arrival duration, a packet size, reference time or offset, an identity of a TSN service, QFI information corresponding to the TSN service, PDU session information corresponding to the TSN service, bearer information corresponding to the TSN service, IP five-tuple information corresponding to the TSN service, Ethernet address information corresponding to the TSN service, an earliest TSN time point to leave the 5GS, a latest TSN time point to leave the 5GS, etc.

The third notification information may be used to help the base station to determine a resource reservation and/or resource scheduling of a corresponding TSN service, for example, to determine semi-static scheduling (SPS) and/or configuration grant (CG) configured for a corresponding TSN service or a corresponding service/bearer/QoS flow cluster of a TSN.

Generally, on+offset=the packet arrival duration, where on represents time of the SPS and/or the CG configured by the base station for the TSN service (namely, time-frequency resources reserved for transmitting a related TSN service or an object corresponding to the TSN service). a value of the offset which is a difference between the packet arrival duration and on may include at least one of the following:
 a maximum delay;
 a maximum delay-time of a packet from a UPF to a RAN-packet processing time of a terminal device;
 a maximum delay-time of a packet from the UPF to the RAN-packet processing time of the terminal device-air interface transmission time;
 a minimum delay;
 a minimum delay-time of a packet from the UPF to the RAN-packet processing time of the terminal device; and
 a minimum delay-time of a packet from the UPF to the RAN-packet processing time of the terminal device-air interface transmission time.

The first device may further send fourth notification information to at least one user plane network element in a 5GS (on an internal path). The fourth notification information may include at least one of the following: processing object information, a TSN time point of earliest arrival, a TSN time point of latest arrival, an ingress duration, a window identity of an ingress window, an earliest TSN time point to leave the 5GS, a latest TSN time point to leave the 5GS, an egress duration, a window identity of an egress window, an identity of a TSN service, a minimum delay, a maximum delay, a packet arrival duration, a packet size, reference time or offset, QFI information corresponding to the TSN service, PDU session information corresponding to the TSN service, bearer information corresponding to the TSN service, IP five-tuple information corresponding to the TSN service, Ethernet address information corresponding to the TSN service, etc.

The fourth notification information may be used to help the user plane network element to determine resource and/or time reservation. The user plane network element may include a UPF.

In the embodiments of the present application, operations performed by the first device may be based on at least one of the following granularity: a service (for example, each service), a quality of service (QoS) flow, a PDU session, an IP five-tuple, a bearer, an Ethernet address, a quality of service (QoS) flow list, a protocol data unit (PDU) session list, an IP five-tuple list, a bearer list, an Ethernet address list, a service list, etc.

It should be noted that, for simplicity of description, the foregoing method embodiments are described as a series of combinations of actions, but a person skilled in the art should know that, the present application is not limited by the described order of the actions due to that some steps may be performed in other orders or simultaneously according to the present application. Secondly, a person skilled in the art should also know that, the embodiments described in the description all belong to preferred embodiments, and the involved actions and modules are not necessarily required in the present application.

In summary, by adopting the solutions of the present application, the egress window information can be determined effectively, thus, the TSN service data packet can leave the 5GS at determined time after arriving at the 5GS at determined time, which enables transmission characteristics and transmission requirements of the TSN service data packet to be ensured by the 5GS serving as a part of a TSN system architecture, and relevant information can be notified to a corresponding device in time, thereby facilitating subsequent processing of the corresponding device.

The foregoing is an introduction of the method embodiments, and the solutions of the present application are further described below by apparatus embodiments.

Figure 5:
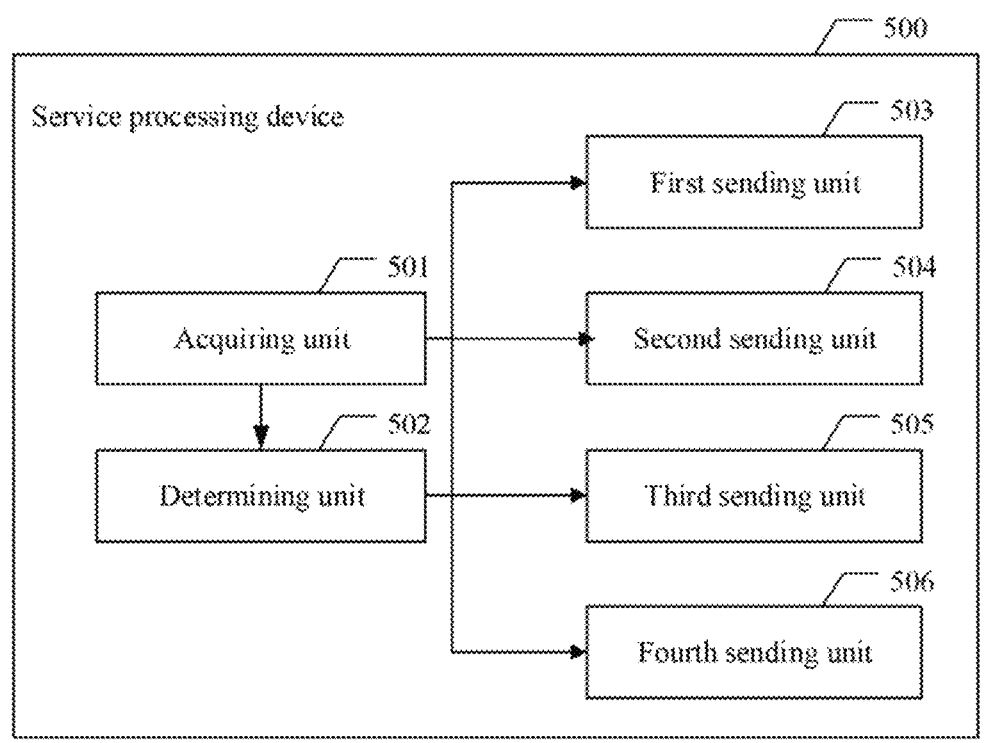
FIG. 5 is a schematic structural diagram of a service processing device 500 according to an embodiment of the present application.

FIG. 5 is a schematic structural diagram of a service processing device 500 according to an embodiment of the present application, as shown in FIG. 5, including: an acquiring unit 501 and a determining unit 502.

The acquiring unit 501 is configured to acquire ingress window information of a service data packet and acquire transmission delay information of the service data packet.

The determining unit 502 is configured to determine egress window information of the service data packet according to the ingress window information and the transmission delay information.

In an embodiment, the service data packet is a TSN service data packet, The following takes the TSN service data packet as an example for description.

The ingress window information may include at least one of the following: a TSN time point of earliest arrival, a TSN time point of latest arrival, an ingress duration, a window identity of an ingress window, and processing object information. The egress window information may include at least one of the following: an earliest TSN time point to leave a 5GS, a latest TSN time point to leave the 5GS, an egress duration, a window identity of an egress window, and processing object information. The transmission delay information may include a maximum delay and a minimum delay.

The service processing device 500 shown in FIG. 5 may further include: a first sending unit 503, configured to send first notification information to an ingress node of the 5GS for transmitting a TSN service.

The first notification information may include at least one of the following: processing object information, a TSN time point of earliest arrival, a TSN time point of latest arrival, an ingress duration, a window identity of an ingress window, an identity of the TSN service, an egress duration, a window identity of an egress window, an earliest TSN time point to leave the 5GS, a latest TSN time point to leave the 5GS, a minimum delay, a maximum delay, a packet arrival duration, a packet size, reference time or offset, QFI information corresponding to the TSN service, PDU session information corresponding to the TSN service, bearer information corresponding to the TSN service, IP five-tuple information corresponding to the TSN service, Ethernet address information corresponding to the TSN service, etc. The PDU session information may at least include PDU session identity information, the bearer information may at least include bearer identity information, and the IP five-tuple information may at least include address information. In an embodiment, the above information may be list information, such as PDU session list information, QFI list information, bearer list information, etc.

The ingress node of the 5GS for transmitting the TSN service may include at least one of the following: a UPF, a UE, a translator, etc.

The first notification information may further include: sending indication information, where the sending indication information is used to indicate whether the ingress node of the 5GS for transmitting the TSN service needs to send dedicated information simultaneously when sending the TSN service data packet. The dedicated information may include at least one of the following: a time stamp when the TSN service data packet arrives at the 5GS, a corresponding window identity of an ingress window when the TSN service data packet arrives at the 5GS, etc.

The service processing device 500 shown in FIG. 5 may further include: a second sending unit 504, configured to send second notification information to an egress node of a 5GS for transmitting a TSN service.

The second notification information may include at least one of the following: processing object information, an earliest TSN time point to leave the 5GS, a latest TSN time point to leave the 5GS, an egress duration, a window identity of an egress window, a window identity of an ingress window, an identity of the TSN service, an ingress duration, an earliest TSN time point to arrive at the 5GS, a latest TSN time point to arrive at the 5GS, a minimum delay, a maximum delay, a packet arrival duration, a packet size, reference time or offset, QFI information corresponding to the TSN service, PDU session information corresponding to the TSN service, bearer information corresponding to the TSN service, IP five-tuple information corresponding to the TSN service, Ethernet address information corresponding to the TSN service, etc.

The egress node of the 5GS for transmitting the TSN service may include at least one of the following: a UPF, a UE, a translator, etc.

The service processing device 500 shown in FIG. 5 may further include: a third sending unit 505, configured to send third notification information to a base station.

The third notification information may include at least one of the following: processing object information, a minimum delay, a maximum delay, a packet arrival duration, a packet size, reference time or offset, an earliest TSN time point to leave the 5GS, a latest TSN time point to leave the 5GS, an identity of a TSN service, QFI information corresponding to the TSN service, PDU session information corresponding to the TSN service, bearer information corresponding to the TSN service, IP five-tuple information corresponding to the TSN service, Ethernet address information corresponding to the TSN service, etc.

A difference between the packet arrival duration and time on of the SPS and/or the CG configured for the TSN service by the base station is an offset. A value of the offset may include at least one of the following: a maximum delay; a maximum delay-time of a packet from a UPF to a RAN-packet processing time of a terminal device; a maximum delay-time of a packet from the UPF to the RAN-packet processing time of the terminal device-air interface transmission time; a minimum delay; a minimum delay-time of a packet from the UPF to the RAN-packet processing time of the terminal device; a minimum delay-time of a packet from the UPF to the RAN-packet processing time of the terminal device-air interface transmission time, etc.

The service processing device 500 shown in FIG. 5 may further include: a fourth sending unit 506, configured to send fourth notification information to at least one user plane network element in a 5GS.

The fourth notification information may include at least one of the following: processing object information, a TSN time point of earliest arrival, a TSN time point of latest arrival, an ingress duration, a window identity of an ingress window, an earliest TSN time point to leave the 5GS, a latest TSN time point to leave the 5GS, an egress duration, a window identity of an egress window, an identity of a TSN service, a minimum delay, a maximum delay, a packet arrival duration, a packet size, reference time or offset, QFI information corresponding to the TSN service, PDU session information corresponding to the TSN service, bearer information corresponding to the TSN service, IP five-tuple information corresponding to the TSN service, Ethernet address information corresponding to the TSN service, etc.

The user plane network element may include a UPF.

The service processing device 500 shown in FIG. 5 may be applied to at least one of the following: a SMF, an AMF, a PCF, a translator, a CNC, etc.

The above processing object information may include at least one of the following: granularity indication information, a service identity, a QoS flow identity, a PDU session identity, IP five-tuple information, a bearer identity, an Ethernet address, a service identity list, a QoS flow identity list, a PDU session identity list, an IP five-tuple list, a bearer identity list, an Ethernet address list, etc.

A first processing object may be determined according to the processing object information. The first processing object may include at least one of the following: a service, a QoS flow, a PDU session, an IP five-tuple, a bearer, an Ethernet address, a service list, a QoS flow list, a PDU session list, an IP five-tuple list, a bearer list, an Ethernet address list, etc.

For example, the first processing object may include at least one of the following: a service with a specific identity, a QoS flow with a specific identity, a PDU session with a specific identity, an IP five-tuple with a specific identity, a bearer with a specific identity, an Ethernet address with a specific identity, a service list with a specific identity, a QoS flow list with a specific identity, a PDU session list with a specific identity, an IP five-tuple list with a specific identity, a bearer list with a specific identity, and an Ethernet address list with a specific identity. In an embodiment, the service processing device 500 may process according to the first processing object, for example, may determine the ingress window information, the egress window information, relationship information between an ingress window and an egress window, an ingress window corresponding to a data packet, an egress window corresponding to the data packet, first notification information, second notification information, third notification information, fourth notification information, etc.

Correspondingly, operations of the service processing device 500 may be based on at least one of the following granularity: a service, a QoS flow, a PDU session, an IP five-tuple, a bearer, an Ethernet address, a service list, a QoS flow list, a PDU session list, an IP five-tuple list, a bearer list, an Ethernet address list, etc.

For specific workflows of the service processing device 500 shown in FIG. 5, reference may be made to the relevant description in the foregoing method embodiments, and details are not described herein again.

Figure 6:
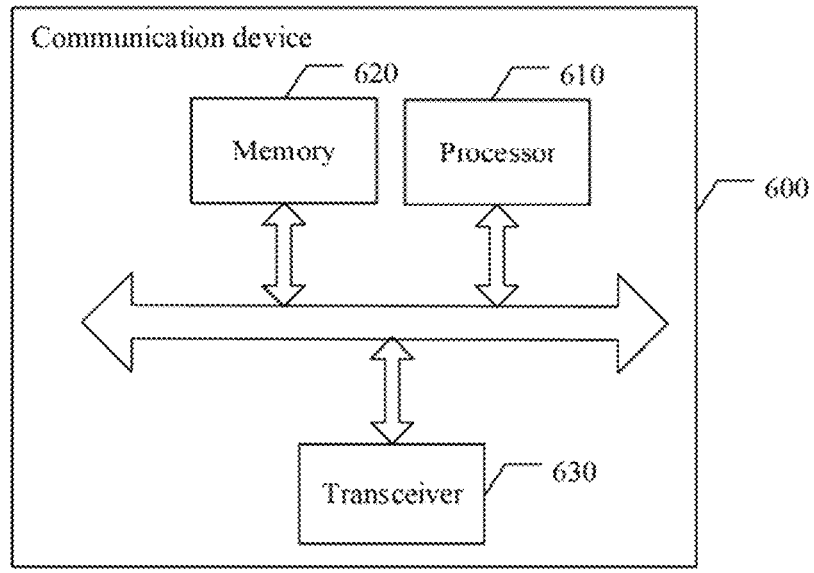
FIG. 6 is a schematic structural diagram of a communication device 600 according to an embodiment of the present application.

FIG. 6 is a schematic structural diagram of a communication device 600 according to an embodiment of the present application. The communication device 600 as shown in FIG. 6 includes a processor 610, where the processor 610 may invoke and run a computer program from a memory to implement the method in the embodiments of the present application.

In an embodiment, as shown in FIG. 6, the communication device 600 may further include a memory 620. The processor 610 may invoke and run the computer program from the memory 620 to implement the method in the embodiments of the present application.

The memory 620 may be a separate device which is independent of the processor 610, or may be integrated in the processor 610.

In an embodiment, as shown in FIG. 6, the communication device 600 may further include a transceiver 630, and the processor 610 may communicate with other devices by controlling the transceiver 630. Specifically, information or data may be sent to other devices, or information or data sent by other devices can be received.

The transceiver 630 may include a transmitter and a receiver. The transceiver 630 may further include an antenna, and the quantity of the antennas may be one or more.

In an embodiment, the communication device 600 may specifically be a network device in the embodiments of the present application, and the communication device 600 may implement corresponding processes implemented by the network device in various methods in the embodiments of the present application. It is not described herein for simplicity.

In an embodiment, the communication device 600 may specifically be a mobile terminal/terminal device in the embodiments of the present application, and the communication device 600 may implement corresponding processes implemented by the mobile terminal/terminal device in various methods in the embodiments of the present application. It is not described herein for simplicity.

Figure 7:
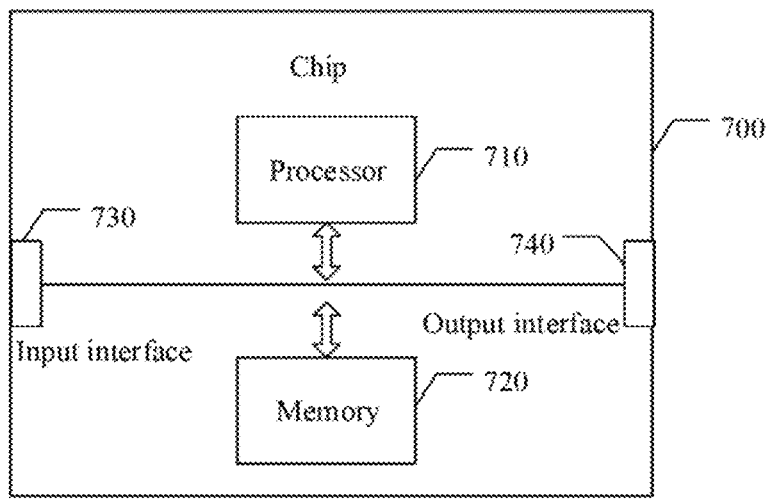
FIG. 7 is a schematic structural diagram of a chip 700 according to an embodiment of the present application.

FIG. 7 is a schematic structural diagram of a chip 700 according to an embodiment of the present application. The chip 700 shown in FIG. 7 includes a processor 710, where the processor 710 may invoke and run a computer program from a memory to implement the method in the embodiments of the present application.

In an embodiment, as shown in FIG. 7, the chip 700 may further include a memory 720, where the processor 710 may invoke and run the computer program from the memory 720 to implement the method in the embodiments of the present application.

The memory 720 may be a separate device which is independent of the processor 710, or may be integrated in the processor 710.

In an embodiment, the chip 700 may further include an input interface 730, where the processor 710 may communicate with other devices or chips by controlling the input interface 730. Specifically, information or data sent by other devices or chips may be acquired.

In an embodiment, the chip 700 may further include an output interface 740, where the processor 710 may communicate with other devices or chips by controlling the output interface 740. Specifically, information or data may be output to other devices or chips.

In an embodiment, the chip may be applied to a network device in the embodiments of the present application, and the chip may implement corresponding processes implemented by the network device in various methods in the embodiments of the present application. It is not described herein for simplicity.

In an embodiment, the chip may be applied to a mobile terminal/terminal device in the embodiments of the present application, and the chip may implement corresponding processes implemented by the mobile terminal/terminal device in various methods in the embodiments of the present application. It is not described herein for simplicity.

It should be understood that, the chip mentioned in the embodiments of the present application may also be referred to as a system on chip, a system chip, a chip system or a system-on-chip chip, etc.

Figure 8:
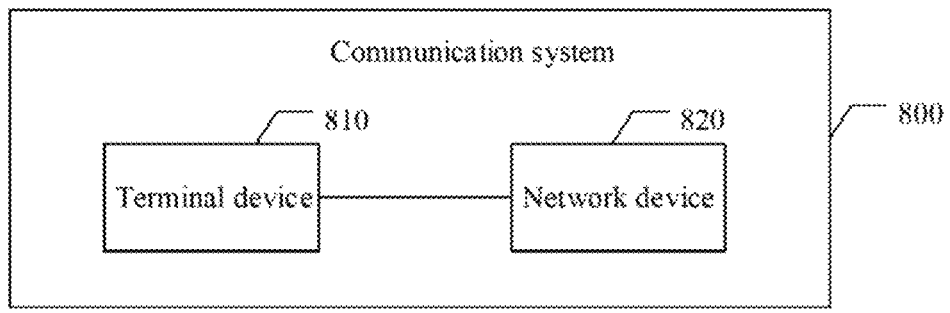
FIG. 8 is a schematic block diagram of a communication system 800 according to an embodiment of the present application.

FIG. 8 is a schematic block diagram of a communication system 800 according to an embodiment of the present application. As shown in FIG. 8, the communication system 800 includes a terminal device 810 and a network device 820.

The terminal device 810 may be configured to implement corresponding functions implemented by the terminal device of the above method, and the network device 820 may be configured to implement corresponding functions implemented by the network device of the above method. It is not described herein for simplicity.

It should be understood that, the processor in the embodiments of the present application may be an integrated circuit chip having a capability of signal processing. In the implementation process, each step of the foregoing method embodiments may be completed by an integrated logic circuit of hardware in the processor or an instruction in a form of software. The processor may be a general processor, a digital signal processor (DSP), an application specific integrated circuit (ASIC), a field programmable gate array (FPGA) or other programmable logic devices, a discrete gate or a transistor logic device, and a discrete hardware component. The methods, steps and logical diagrams disclosed in the embodiments of the present application may be implemented or executed. The general processor may be a microprocessor or the processor may also be any conventional processor or the like. The steps of the method disclosed in the embodiments of the present application may be directly executed by a hardware decoding processor, or by a combination of the hardware and software modules in the decoding processor. The software modules may be located in a mature storage medium in the art, i.e. a random memory, a flash memory, a read-only memory, a programmable read-only memory, or an electrically erasable programmable memory, a register, etc. The storage medium is located in a memory, the processor reads information in the memory, and completes the steps of the above methods in combination with hardware thereof.

It should also be understood that, the memory in the embodiments of the present application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which functions as an external cache. Description is illustrative but not restrictive, RAM in many forms may be available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM, an enhanced synchronous dynamic random access memory (Enhanced SDRAM, ESDRAM), a synchronous connection dynamic random access memory (Synchlink DRAM, SLDRAM) and a direct Rambus random access memory (Direct Rambus RAM, DR RAM). It should be noted that, the memory of the systems and methods described herein is intended to include, but is not limited to, these and any memory in other suitable types.

An embodiment of the present application further provides a computer readable storage medium for storing a computer program.

In an embodiment, the computer readable storage medium may be applied to a network device in the embodiments of the present application, and the computer program may enable a computer to execute corresponding processes implemented by the network device in various methods in the embodiments of the present application. It is not described herein for simplicity.

In an embodiment, the computer readable storage medium may be applied to a mobile terminal/terminal device in the embodiments of the present application, and the computer program may enable a computer to execute corresponding processes implemented by the mobile terminal/terminal device in various methods in the embodiments of the present application. It is not described herein for simplicity.

An embodiment of the present application further provides a computer program product which includes computer program instructions.

In an embodiment, the computer program product may be applied to a network device in the embodiments of the present application, and the computer program instructions may enable a computer to execute corresponding processes implemented by the network device in various methods in the embodiments of the present application. It is not described herein for simplicity.

In an embodiment, the computer program product may be applied to a mobile terminal/terminal device in the embodiments of the present application, and the computer program instructions may enable a computer to execute corresponding processes implemented by the mobile terminal/terminal device in various methods in the embodiments of the present application. It is not described herein for simplicity.

An embodiment of the present application further provides a computer program.

In an embodiment, the computer program may be applied to a network device in the embodiments of the present application. The computer program which, when running on a computer, enables the computer to execute corresponding processes implemented by the network device in various methods in the embodiments of the present application. It is not described herein for simplicity.

In an embodiment, the computer program may be applied to a mobile terminal/terminal device in the embodiments of the present application. The computer program which, when running on a computer, enables the computer to execute corresponding processes implemented by the mobile terminal/terminal device in various methods in the embodiments of the present application. It is not described herein for simplicity.

A person of ordinary skill in the art may realize that, the units and algorithm steps described in the embodiments disclosed herein may be implemented in electronic hardware, or a combination of computer software and electronic hardware. Whether these functions are executed in a manner of hardware or software depends on the particular application and design constraints of the technical solution. Professionals may use different methods for each particular application to implement the described functions, but such implementations should not be considered to be beyond the scope of the present application.

A person skilled in the pertinent art may clearly understand that, for the convenience and simplicity of description, the specific working processes of the systems, apparatuses and units described above may refer to the corresponding processes in the foregoing method embodiments, which are not described herein again.

In the several embodiments provided in the present application, it should be understood that, the disclosed systems, apparatuses and methods may be implemented in other manners. For example, the apparatus embodiments described above are merely schematic. For example, the division of the units is merely a logical function division, and there may be another division manner in an actual implementation. For example, a plurality of units or components may be combined or integrated in another system, or some features may be ignored or not performed. In another point, the displayed or discussed coupling to each other or direct coupling or a communication connection may be through some interfaces. Indirect coupling or a communication connection of the apparatuses or the units may be electrical, mechanical or in other forms.

The units described as separate components may or may not be physically separate, and the components displayed as units may or may not be physical units, that is, may be located in one place, or may be distributed to a plurality of network units. Some or all of the units may be selected according to actual needs to achieve the purpose of the solution of the present embodiment.

In addition, each functional unit in each embodiment of the present application may be integrated in one processing unit, or each unit may be physically present separately, or two or more units may be integrated in one unit.

The function may be stored in a computer readable storage medium if it is implemented in the form of a software function unit and sold or used as an independent product. Based on such understanding, the technical solutions of the present application, or a part contributing to the prior art, or a part of the technical solutions may be embodied in the form of a software product essentially. The computer software product is stored in a storage medium, which includes some instructions for enabling a computer device (which may be a personal computer, a server, or a network device, etc.) to execute all or part of the steps of the method described in each embodiment of the present application. The foregoing storage medium includes: a U disk, a mobile hard drive, a ROM, a RAM, a disk, or a compact disk, and any other medium that can store program codes.

The above are merely specific embodiments of the present application, but the protection scope of the present application is not limited thereto. Any variation or replacement readily conceivable by a person skilled in the art within the technical scope disclosed in the present application should be covered within the protection scope of the present application. Therefore, the protection scope of the present application should be defined by the protection scope of the claims.

What is claimed is:

1. A service processing method, comprising:
acquiring, by a first device, ingress window information of a service data packet;
acquiring, by the first device, transmission delay information of the service data packet; and
determining, by the first device, egress window information of the service data packet according to the ingress window information and the transmission delay information;
wherein the service data packet comprises a time sensitive network (TSN) service data packet; and
wherein the method further comprises:
sending, by the first device, first notification information to an ingress node of a fifth generation mobile communication system (5GS) for transmitting TSN service;
wherein the first notification information comprises sending indication information which is used to indicate that the ingress node of the 5GS for transmitting the TSN service simultaneously sends dedicated information comprising a time stamp when the TSN service data packet arrives at the 5GS when sending the TSN service data packet, and the dedicated information is used to help an egress node of the 5GS for transmitting the TSN service to determine by which egress window the received TSN service data packet sends.

2. The method according to claim 1, wherein the ingress window information comprises at least one of the following: a TSN time point of earliest arrival, a TSN time point of latest arrival, an ingress duration, a window identity of an ingress window, and processing object information; and the egress window information comprises at least one of the following: an earliest TSN time point to leave the 5GS, a latest TSN time point to leave the 5GS, and egress duration, a window identity of an egress window, and processing object information.

3. The method according to claim 1, wherein the first device comprises at least one of the following: a session management function (SMF) entity, an access and mobility management function (AMF) entity, a policy control function (PCF) entity, a translator, and a centralized network configuration (CNC) entity.

4. A service processing device, comprising: a processor and a memory, wherein the memory is configured to store a computer program, and the computer program stored in the memory is invoked and run by the processor to:

acquire ingress window information of a service data packet and acquire transmission delay information of the service data packet; and determine egress window information of the service data packet according to the ingress window information and the transmission delay information;

wherein the service data packet comprises a time sensitive network (TSN) service data packet;

wherein the processor is further configured to send first notification information to an ingress node of a fifth generation mobile communication system (5GS) for transmitting a TSN service;

wherein the first notification information comprises sending indication information which is used to indicate that the ingress node of the 5GS for transmitting the TSN service simultaneously sends dedicated information comprising a time stamp when the TSN service data packet arrives at the 5GS when sending the TSN service data packet, and the dedicated information is used to help an egress node of the 5GS for transmitting the TSN service to determine by which egress window the received TSN service data packet sends.

5. The service processing device according to claim 4, wherein the ingress window information comprises at least one of the following: a TSN time point of earliest arrival, a TSN time point of latest arrival, an ingress duration, a window identity of an ingress window, and processing object information; and the egress window information comprises at least one of the following: an earliest TSN time point to leave the 5GS, a latest TSN time point to leave the 5GS, an egress duration, a window identity of an egress window, and processing object information.

6. The service processing device according to claim 4, wherein the transmission delay information comprises a maximum delay and a minimum delay.

7. The service processing device according to claim 4; wherein the first notification information further comprises at least one of the following: processing object information, a TSN time point of earliest arrival, a TSN time point of latest arrival, an ingress duration, a window identity of an ingress window, an identity of the TSN service, an egress duration, a window identity of an egress window, an earliest TSN time point to leave the 5GS, a latest TSN time point to leave the 5GS, a minimum delay, a maximum delay, a packet arrival duration, a packet size, reference time or offset, quality of service flow identity (QFI) information corresponding to the TSN service, protocol data unit (PDU) session information corresponding to the TSN service, bearer information corresponding to the TSN service, IP five-tuple information corresponding to the TSN service, and Ethernet address information corresponding to the TSN service.

8. The service processing device according to claim 7, the ingress node of the 5GS for transmitting the TSN service comprises at least one of the following: a user plane function (UPF) entity, a user equipment (UE), and a translator.

9. The service processing device according to claim 7, wherein the dedicated information farther comprises a corresponding window identity of an ingress window when the TSN service data packet arrives at the 5GS.

10. The service processing device according to claim 4, wherein the processor is further configured to send second notification information to an egress node of the 5GS for transmitting a TSN service;

wherein the second notification information comprises at least one of the following: processing object information, an earliest TSN time point to leave the 5GS, a latest TSN time point to leave the 5GS, an egress duration, a window identity of an egress window, a window identity of an ingress window, an identity of the TSN service, an ingress duration, an earliest TSN time point to arrive at the 5GS, a latest TSN time point to arrive at the 5GS, a minimum delay, a maximum delay, a packet arrival duration, a packet size, reference time or offset, quality of service flow identity (QFI) information corresponding to the TSN service, protocol data unit (PDU) session information corresponding to the TSN service, bearer information corresponding to the TSN service, IP five-tuple information corresponding to the TSN service, and Ethernet address information corresponding to the TSN service.

11. The service processing device according to claim 10, wherein the egress node of the 5GS for transmitting the TSN service comprises at least one of the following: a user plane function (UPF) entity, a user equipment (UE), and a translator.

12. The service processing device according to claim 4, wherein the processor is further configured to send third notification information to a base station;

wherein the third notification information comprises at least one of the following: processing object information, a minimum delay, a maximum delay, a packet arrival duration, a packet size, reference time or offset, an earliest TSN time point to leave the 5GS, a latest TSN time point to leave the 5GS, an identity of a TSN service, quality of service flow identity (QFI) information corresponding to the TSN service, protocol data unit (PDU) session information corresponding to the TSN service, bearer information corresponding to the TSN service, IP five-tuple information corresponding to the TSN service, and Ethernet address information corresponding to the TSN service.

13. The service processing device according to claim 12, wherein a difference between the packet arrival duration and time on of semi-persistent scheduling (SPS) and/or configuration grant (CG) configured for the TSN service by the base station is an offset;
   wherein a value of the offset comprises at least one of the following:
   a maximum delay;
   a maximum delay-time of a packet from a user plane function (UPF) entity to a radio access network (RAN)-packet processing time of a terminal device;
   a maximum delay-time of a packet from the UPF to the RAN-packet processing time of the terminal device-air interface transmission time;
   a minimum delay;
   a minimum delay-time of a packet from the UPF to the RAN-packet processing time of the terminal device; and
   a minimum delay-time of a packet from the UPF to the RAN-packet processing time of the terminal device-air interface transmission time.

14. The service processing device according to claim 4, wherein the processor is further configured to send fourth notification information to at least one user plane network element in the 5GS;
   wherein the fourth notification information comprises at least one of the following: processing object information, a TSN time point of earliest arrival, a TSN time point of latest arrival, an ingress duration, a window identity of an ingress window, an earliest TSN time point to leave the 5GS, a latest TSN time point to leave the 5GS, an egress duration, a window identity of an egress window, an identity of a TSN service, a minimum delay, a maximum delay, a packet arrival duration, a packet size, reference time or offset, quality of service flow identity (QFI) information corresponding to the TSN service, protocol data unit (PDU) session information corresponding to the TSN service, bearer information corresponding to the TSN service, IP five-tuple information corresponding to the TSN service, and Ethernet address information corresponding to the TSN service;
   wherein the user plane network element comprises a user plane function UPF entity.

15. The service processing device according to claim 4, wherein the service processing device is applied to at least one of the following: a session management function (SMF) entity, an access and mobility management function (AMF) entity, a policy control function (PCF) entity, a translator, and a centralized network configuration (CNC) entity.

16. The service processing device according to claim 5, wherein the processing object information comprises at least one of the following:
   granularity indication information, a service identity, a quality of service (QoS) flow identity, a protocol data unit (PDU) session identity, IP five-tuple information, a bearer identity, an Ethernet address, a service identity list, a QoS flow identity list, a PDU session identity list, an IP five-tuple list, a bearer identity list, and an Ethernet address list.

17. A computer readable storage medium, configured to store a computer program, and the computer program enables a computer to:
   acquire ingress window information of a service data packet and acquire transmission delay information of the service data packet; and
   determine egress window information of the service data packet according to the ingress window information and the transmission delay information;
   wherein the service data packet comprises a time sensitive network (TSN) service data packet;
   wherein the computer program further enables a computer to send first notification information to an ingress node of a fifth generation mobile communication system (5GS) for transmitting a TSN service;
   wherein the first notification information comprises sending indication information which is used to indicate that the ingress node of the 5GS for transmitting the TSN service simultaneously sends dedicated information comprising a time stamp when the TSN service data packet arrives at the 5GS when sending the TSN service data packet, and the dedicated information is used to help an egress node of the 5GS for transmitting the TSN service to determine by which egress window the received TSN service data packet sends.

* * * * *